Dec. 16, 1958 P. J. HAKE 2,864,158
METHOD OF ASSEMBLING A SEAL FOR BLAST-FURNACE DISTRIBUTOR
Filed Feb. 5, 1954 3 Sheets-Sheet 1
FIG.1.
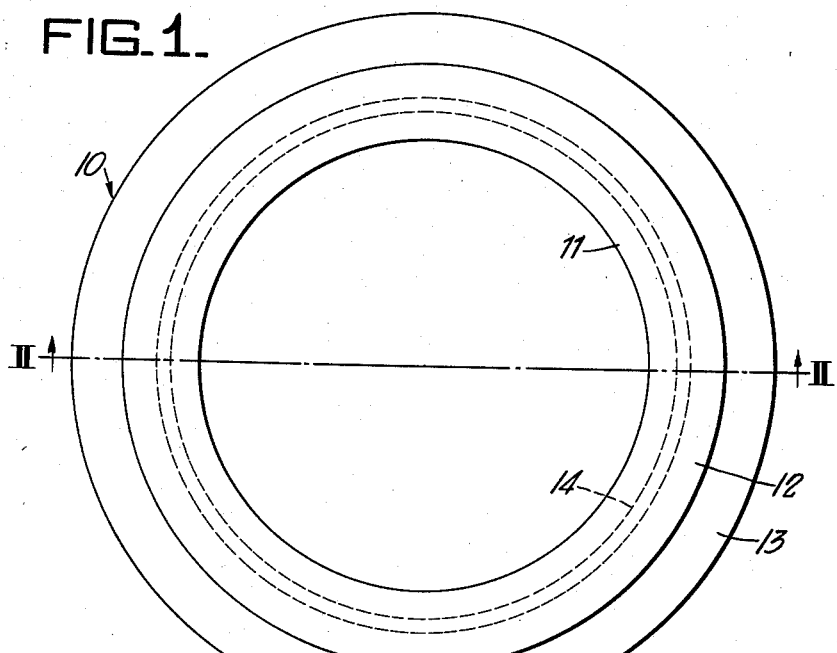
FIG.2.
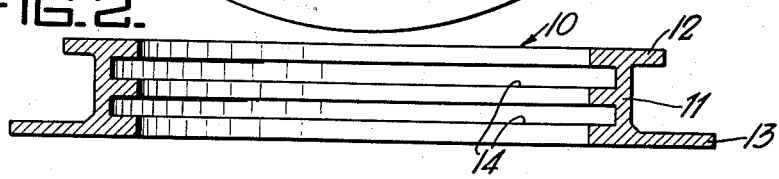
FIG.3.
FIG.5.
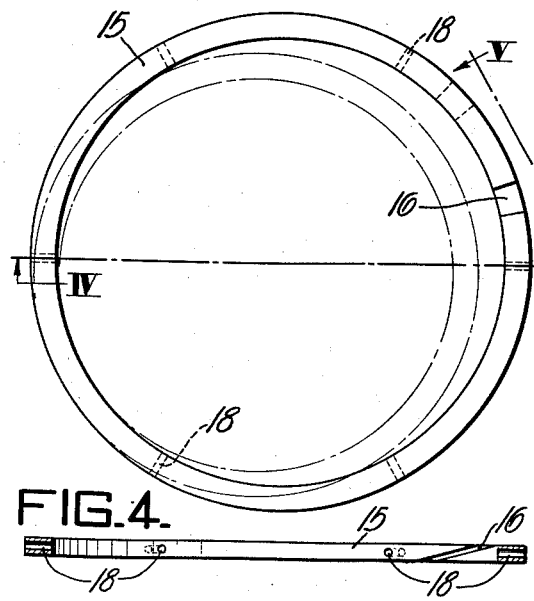
FIG.4.
Inventor:
PERCY J. HAKE,
by: Donald G. Dalton
his Attorney

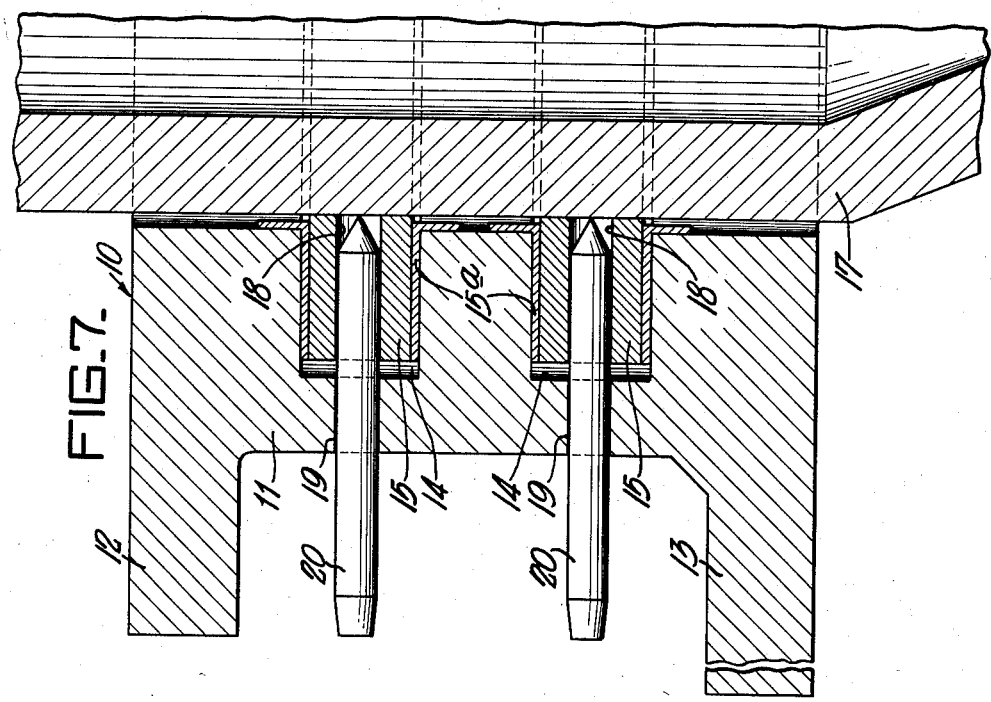
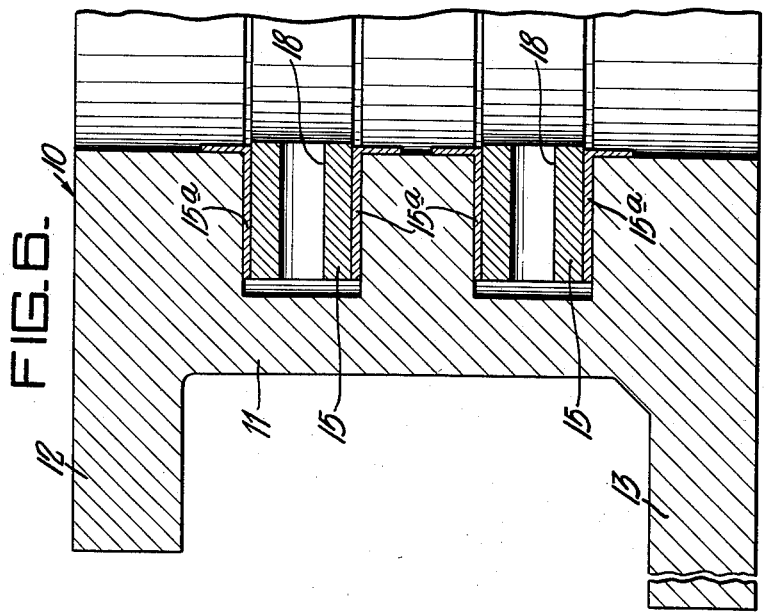

Dec. 16, 1958 P. J. HAKE 2,864,158
METHOD OF ASSEMBLING A SEAL FOR BLAST-FURNACE DISTRIBUTOR
Filed Feb. 5, 1954 3 Sheets-Sheet 3
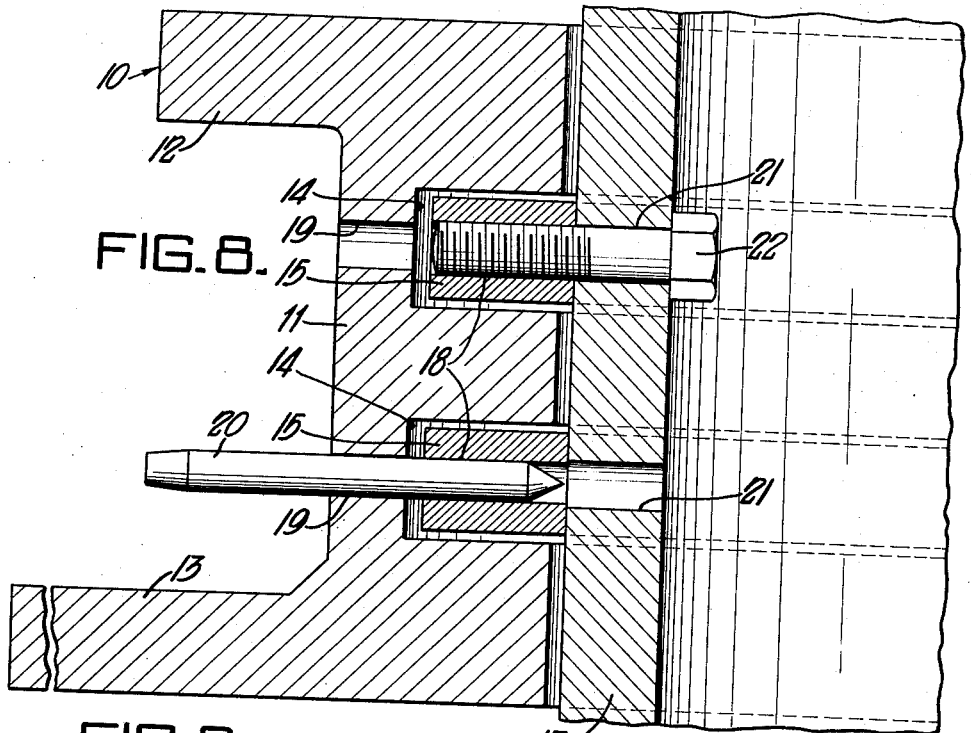
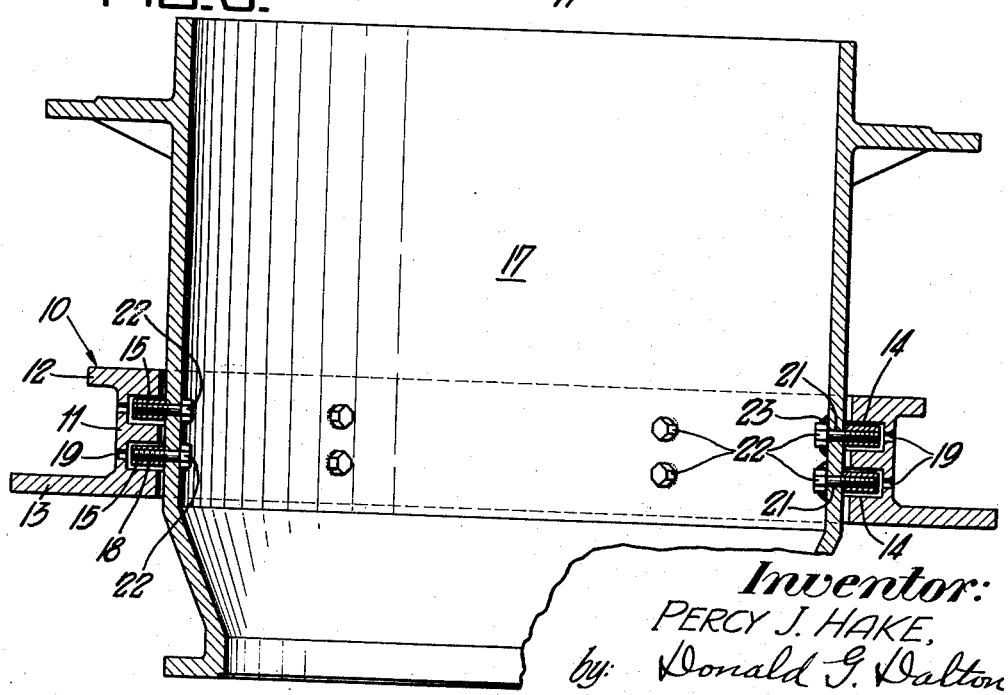
Inventor:
PERCY J. HAKE,
by: Donald G. Dalton
his Attorney

United States Patent Office 2,864,158
Patented Dec. 16, 1958

2,864,158
METHOD OF ASSEMBLING A SEAL FOR BLAST-FURNACE DISTRIBUTOR

Percy J. Hake, Gary, Ind., assignor to United States Steel Corporation, a corporation of New Jersey Application February 5, 1954, Serial No. 408,461

3 Claims. (Cl. 29—406)

This invention relates generally to a blast-furnace top and, in particular, to a method of assembling a seal for the distributor thereof.

In the construction of blast-furnaces, it has been proposed to mount seal rings on the rotary hopper or distributor with which the small bell cooperates, and to groove the stationary base ring in which the distributor fits rotatably, for accommodating said seal rings. This provides a labyrinth or baffle seal for the clearance space necessary between the base ring and the distributor to permit free rotation of the latter in the former. In some instances, the seal rings were held on the distributor only by the friction resulting from a press fit but they eventually came loose from the distributor and froze tight in the base-ring grooves after which resulting wear created an excessive clearance between the seal rings and distributor which was left unobstructed, permitting the ready escape of furnace gases.

To avoid this difficulty, the seal rings were welded to the distributor before assembly of the latter with the base ring. This construction, however, necessitated a split or two-part base ring which could be assembled about the distributor and this introduced other disadvantages. In either case, maintenance of the seal rings was a serious problem because of their location, the adverse conditions to which they are subjected and the size and weight of the seal rings, distributor and base ring, making assembly and disassembly a major repair and necessitating a shut-down of the furnace.

I have invented a method of assembling a seal construction for blast-furnace distributors, whereby the seal rings are positively secured to the distributor yet can be inserted in grooves in a unitary base ring, thus avoiding practically all maintenance and ensuring that the seal will serve effectively for the full length of a normal furnace campaign. In a preferred embodiment and practice, I employ unitary sealing rings each having an overlapping joint or discontinuity at one point on its circumference whereby the ring may be contracted sufficiently to be inserted in its slot in the base ring and then permitted to expand to normal size for receiving the distributor. Alined radial holes are drilled in the seal rings and base ring and the distributor is then assembled with the base ring and marked for the drilling of radial holes therein alined with those in the seal rings and base ring. The distributor is then removed from the base ring and drilled, and the holes in the seal rings are tapped. On reassembling the base ring and distributor, the seal rings are fastened to the distributor by screws and thus positively secured thereto. The seal disclosed herein is also disclosed and claimed in my application, Serial No. 718,028, which is a division hereof.

A complete understanding of the invention may be obtained from the following detailed description and explanation which refer to the accompanying drawings illustrating the present preferred embodiment. In the drawings, Figure 1 is a plan view of the base ring;

Figure 2 is a cross section taken on a diameter thereof;

Figures 3 and 4 are views similar to Figures 1 and 2 showing a seal ring;

Figure 5 is a partial section to enlarged scale taken on the line V—V of Figure 3;

Figures 6, 7 and 8 are partial radial sections through the base ring (and the distributor, in the case of Figures 7 and 8), to enlarged scale, showing successive steps of the installation; and Figure 9 is a diametral section through the distributor showing the completed installation.

Referring now in detail to the drawings and, for the present to Figures 1 through 5, a unitary circular base ring 10 has a cylindrical wall 11, upper and lower external flanges 12 and 13, and axially spaced circumferential grooves 14 in the inner surface of wall 11. Contractible circular seal rings 15 are of such size and shape as normally to fit loosely in grooves 14. Each of rings 15 has a joint or discontinuity 16 at one point on its circumference so it may be contracted sufficiently, as shown in dotted lines in Figure 3, to permit it to be inserted in one of the grooves 14. That is to say, rings 15, in their normal expanded condition shown in solid lines in Figure 3, have about the same I. D. and O. D. as grooves 14 and must be contracted radially in order to be placed therein, whereupon they expand to normal size. Ring 10 may conveniently be a steel casting and rings 15 are preferably formed from wrought steel bar.

A rotary cylindrical hopper or distributor 17 (see Figures 7 through 9) is dimensioned to telescope into rings 10 and 15, fitting loosely in the former and snugly in the latter. The mounting of the distributor on the furnace top, its relation thereto and the drive therefor are all well known and require no detailed description or illustration. Mohr Patent No. 2,486,312 shows a construction which is typical in respect to these features.

Before rings 15 are inserted in the base-ring grooves, they are preferably drilled to provide a plurality of radial screw holes 18. When drilled, the rings are contracted and inserted in ring 10, in the absence of the distributor. After expansion of rings 15 to normal size, shims 15a are inserted to space the rings from both the bottom and top of grooves 14. This condition is shown in Figure 6. I then drill outwardly through the wall 11 of the base ring, using the seal rings as jigs, thereby providing holes 19 (see Figure 7) in the base ring alined with each of those in the two seal rings. When the drilling of holes 19 is complete, I insert center punches 20 in holes 19. I then assemble the distributor 17 with the rings 10 and 15 by telescoping it into them and positioning it in the same relation to them axially and radially, as it is to have when finally installed in the furnace top. This condition of the several elements is illustrated in Figure 7, the axial relation of the distributor to the base ring being about as shown in the aforesaid Mohr patent.

By a hammer blow on the outer end of each punch 20, I mark the exterior of the distributor with centers for drilling radial holes therethrough in alinement with holes 18 and 19. I then remove the distributor from the base ring and drill such holes through the former, as indicated at 21 in Figure 8. I also tap holes 18 in rings 15 for receiving cap screws, preferably without removing the rings 15 from ring 10. Punches 20 are removed successively during tapping but are then replaced. Shims 15a are then removed leaving rings 15 supported on punches 20 free from direct contact with the base ring 10.

Distributor 17 is then reassembled with the base ring and seal rings by telescoping, with holes 18, 19 and 21 in alinement. Punches 20 are then removed one at a time and, as each punch is removed, a cap screw 22 is inserted from the interior of the distributor through one of holes 21, threaded into one of holes 18 and turned up tight thereby positively securing the seal rings to the distributor, free from contact with either of the top or bottom walls of the grooves. To ensure the connection of rings 15 to the distributor, the heads of the screws may be welded as at 23 to the interior surface of the distributor.

It will be apparent from the foregoing that my improved seal and method of assembly positively prevent separation of the seal rings from the distributor at all times while permitting them to be easily assembled with a unitary base ring before being finally secured to the distributor.

Although I have disclosed herein the preferred practice of my invention, I intend to cover as well any change or modification therein which may be made without departing from the spirit and scope of the invention.

I claim:

1. In a method of assembling a seal for the space between a rotatable cylindrical hopper and a base ring having an internal circumferential groove, the steps including providing a contractible metal seal ring, first drilling a plurality of spaced radial holes in the seal ring and then inserting the seal ring in the groove of the base ring, drilling radial holes through the base ring using the seal ring as a jig, telescoping the hopper with the base ring and seal ring, spotting on the exterior of the hopper through the holes in the seal ring and base ring, the locations for holes alined therewith, removing the base ring from the hopper, drilling radial holes in the hopper at said locations, again telescoping the hopper with the base ring and seal ring, inserting screws in the holes in the hopper, from the interior thereof, and turning the screws into the holes in the seal ring.

2. The method defined by claim 1 characterized by shimming the seal ring out of contact with the walls of said groove prior to drilling the base ring.

3. The method defined by claim 2 characterized by removing the shimming and inserting supporting pins through the base ring into the seal ring before the final telescoping of the hopper and rings.

References Cited in the file of this patent

UNITED STATES PATENTS

| | | |
|---|---|---|
| 987,130 | Geyer | Mar. 21, 1911 |
| 2,018,683 | Meyer et al. | Oct. 29, 1935 |
| 2,186,799 | Boker | Jan. 9, 1940 |
| 2,379,632 | Foisy | July 3, 1945 |
| 2,468,924 | Courtier | May 3, 1949 |
| 2,486,312 | Mohr | Oct. 25, 1949 |
| 2,500,295 | Peirce | Mar. 14, 1950 |
| 2,532,815 | Kindsvatter | Dec. 5, 1950 |
| 2,707,322 | Strain et al. | May 3, 1955 |

FOREIGN PATENTS

| | | |
|---|---|---|
| 796,855 | France | Feb. 3, 1936 |